(12) United States Patent
Sarchi et al.

(10) Patent No.: US 9,595,370 B2
(45) Date of Patent: Mar. 14, 2017

(54) ELECTRIC CABLES FOR SOLAR PLANTS GENERATING ELECTRICAL AND THERMAL ENERGY, AND PLANTS COMPRISING THE ELECTRICAL CABLES

(71) Applicant: PRYSMIAN S.p.A., Milan (IT)

(72) Inventors: Davide Sarchi, Milan (IT); Eduard Herold, Milan (IT); Paolo Martinelli, Milan (IT); Massimo Bechis, Milan (IT); Burkhard Schorr, Milan (IT)

(73) Assignee: PRYSMIAN S.p.A., Milan (IT)

( * ) Notice: Subject to any disclaimer, the term of this patent is extended or adjusted under 35 U.S.C. 154(b) by 0 days.

(21) Appl. No.: 14/071,210

(22) Filed: Nov. 4, 2013

(65) Prior Publication Data

US 2014/0124232 A1      May 8, 2014

(30) Foreign Application Priority Data

Nov. 7, 2012   (IT) .............................. MI2012A1899

(51) Int. Cl.
*F16L 11/12*      (2006.01)
*H01B 7/00*      (2006.01)
(Continued)

(52) U.S. Cl.
CPC .......... *H01B 7/0072* (2013.01); *F16L 11/127* (2013.01); *F16L 11/22* (2013.01);
(Continued)

(58) Field of Classification Search
CPC .. F03G 6/06; F16L 11/127; F16L 11/22; F24J 2/06; F24J 2/4647; G02B 6/4416;
(Continued)

(56) References Cited

U.S. PATENT DOCUMENTS 989,532  A  *  4/1911  MacDuffee ..................... 174/47
4,549,041  A  *  10/1985  Shingo ..................... C08K 3/22
                                                   174/113 R (Continued)

FOREIGN PATENT DOCUMENTS

EP          0562331 A2    9/1993
GB           875930 A     8/1961
(Continued)

OTHER PUBLICATIONS

Ethylene-Vinyl Acetate—wikipedia 2011.*
Italian Search Report for IT MI 2012 A 001899 dated Jul. 1, 2013.

*Primary Examiner* — Timothy Thompson
*Assistant Examiner* — Guillermo Egoavil
(74) *Attorney, Agent, or Firm* — MH2 Technology Law Group LLP

(57) ABSTRACT

A composite flat cable, having in cross-section a major side, may include an outer sheath; two main electrical conductors; and two ducts for fluid circulation configured to circulate fluid. A composite flat cable may include two ducts configured to circulate fluid; a first main electrical conductor on a first side of the two ducts; a second main electrical conductor on a second side of the two ducts; and a sheath around the two ducts, the first main electrical conductor, and second main electrical conductor. A solar cogeneration plant may include at least one cell configured to produce electric current, connected to a plant for distribution of electrical energy and of heated fluid by a composite flat cable.

16 Claims, 4 Drawing Sheets

(51) Int. Cl.
*F16L 11/127* (2006.01)
*F16L 11/22* (2006.01)
*F24J 2/46* (2006.01)

(52) U.S. Cl.
CPC ............. *F24J 2/4647* (2013.01); *Y02E 10/40* (2013.01); *Y02E 20/14* (2013.01)

(58) Field of Classification Search
CPC ...... G02B 6/4459; H01B 7/38; H01B 7/0072; H01B 7/0823; H01B 9/003; H01B 9/005; H01F 6/06; H01F 2027/2819; H01L 39/14; H02G 3/0462; H02G 3/32; H02G 11/00; Y02E 10/40; Y02E 20/14; Y10T 29/49014
USPC ....... 29/599; 174/15.4, 27, 47, 117 F, 125.1; 257/E39.017; 264/171.13; 425/113
See application file for complete search history.

(56) References Cited

U.S. PATENT DOCUMENTS

| | | | |
|---|---|---|---|
| 4,743,711 A * | 5/1988 | Hoffman | 174/109 |
| 4,857,675 A * | 8/1989 | Marancik | H01F 6/06 174/125.1 |
| 2002/0053460 A1* | 5/2002 | Takeda | G02B 6/4416 174/117 F |
| 2005/0023029 A1* | 2/2005 | Mammeri | B32B 1/08 174/121 A |
| 2006/0217460 A1* | 9/2006 | Hoshio et al. | 523/205 |
| 2010/0072657 A1* | 3/2010 | Lind | H02G 3/0462 264/171.13 |
| 2010/0263909 A1* | 10/2010 | Grogl | H01B 7/223 174/126.1 |
| 2012/0211118 A1* | 8/2012 | Tognon | 138/149 |
| 2013/0269966 A1* | 10/2013 | Emme | 174/15.6 |

FOREIGN PATENT DOCUMENTS

| | | |
|---|---|---|
| GB | 1368497 A | 9/1974 |
| WO | WO-2012/079631 A1 | 6/2012 |

* cited by examiner

ELECTRIC CABLES FOR SOLAR PLANTS GENERATING ELECTRICAL AND THERMAL ENERGY, AND PLANTS COMPRISING THE ELECTRICAL CABLES

CROSS-REFERENCE TO RELATED APPLICATION(S)

This application claims priority under 35 U.S.C. §119 from Italian Patent Application No. MI 2012 A 001899, filed on Nov. 7, 2012, in the Italian Patent and Trademark Office, the entire contents of which are incorporated herein by reference.

The present invention relates to an electric cable. In particular, the present invention relates to an electric cable for a solar plant for generating electrical energy and thermal energy. The present invention also relates to a solar plant comprising said cable.

Solar plants for generating electrical energy from solar radiation are known. By way of example, photovoltaic plants generating electrical energy by converting solar radiation by means of photovoltaic modules are known.

Solar plants for generating heat are also known. Generally, these solar plants heat up a fluid, for example water.

Finally, hybrid solar plants affording electrical energy and thermal energy generation are known. Such plants are also known as "solar cogeneration" plants. Hereinbelow, as "solar cogeneration plant" it is meant a plant able to convert solar radiation into electrical energy and into thermal energy.

Typically, a solar cogeneration plant comprises at least one cell producing electric current, for example a photovoltaic cell, and optionally a solar radiation concentrator. Typically, a cogeneration plant comprises at least one surface exposed to the solar radiation and, optionally, capable to orient itself to follow the path of the sun. The concentrator provides for obtaining a greater solar radiation (photons) density on the cell.

Typically, a solar cogeneration plant also comprises an electric circuit for transporting the generated electrical energy and a hydraulic circuit for transporting the heated fluid. The electric circuit, in turn, comprises two electric conductors and the hydraulic circuit, in turn, comprises two ducts, one for the fluid to be heated and one for the heated fluid.

The Applicant has found that the management in situ of electric conductors, of the relative electric connectors, of ducts for fluid transportation and of the relative connections is complex and rather inconvenient, since the installer has to take care not to cast the cables and tubes shades onto the concentrator or onto the surface exposed to the sun, and also has to check the correct relative positioning of conductors and tubes, which involves a longer installation time and therefore higher costs. Moreover, an installer could make errors and carry out connections which are incorrect or, anyway, which do not guarantee the safety and the efficiency of the plant.

The Applicant set themselves the target of improving the management of the electric conductors and of the ducts for fluid transportation in a solar cogeneration system.

The Applicant perceived that the above mentioned target can be achieved by organizing electric conductors and ducts for fluid transportation in a single cable of a flat configuration (where the internal elements are arranged with longitudinal axes that are substantially parallel and lie in the same plane).

With respect to a cable having a circular cross section, a flat cable has disadvantages in terms of flexibility as it can be easily folded in two directions only. Therefore, the selection of a flat cable for facilitating the installation and the management of a solar cogeneration plant may not be advantageous prima facie.

However, the Applicant found that the organization of electric conductors and ducts for fluid transportation in a single flat cable has surprising advantages, as will be explained hereinbelow.

WO 2012/079631 describes a high voltage electric cable comprising at least one cable core, at least one cooling pipe for cooling the cable core adapted for carrying a cooling fluid, and a cable covering enclosing the at least one cable core and the at least one cooling pipe. The electric cable further comprises at least one heat conducting element surrounding the at least one cable core, and being arranged in thermal contact with the at least one cable core and the at least one cooling pipe.

GB 1368497 describes an electric power cable assembly which comprises an electric power cable having a duct along the length thereof for circulating an evaporable refrigerant to cool the cable.

GB 875930 describes a heavy-current electric cable comprising an insulated metal-sheathed core enclosed in an outer impermeable protective covering of plastic material in which a plurality of ducts or channels are provided for the circulation of a cooling fluid therethrough.

The solutions above relate to electric cables containing ducts for circulating a fluid suitable for keeping the temperature of the cable within defined limits.

The fluid of the circulation system of the present invention heats up and substantially retains the heat acquired along the entire extension of the cable, making it available to a user of the cogeneration system.

In a first aspect, the present invention relates to a composite flat cable having, in cross section, a major side, and comprising two main electric conductors and at least two ducts for fluid circulation.

Advantageously, the main electric conductors are arranged in proximity of one end of the major side of the composite cable.

For the purposes of the present description and claims, the term "composite cable" denotes a cable comprising electric conductors, also configured to transport currents of differing value, together with other elements having a different function, for example tubes for fluid transportation.

For the purposes of the present description and claims, the term "flat cable" denotes a cable in which the internal elements are arranged with longitudinal axes substantially parallel and lying in the same plane.

Typically, the shape of a flat cable in cross section, considered on a plane transverse to the longitudinal axis of the cable, is substantially rectangular. It preferably has rounded edges. The major side of this cross section is referred to as the width and the minor side is referred to as the height. Preferably, the width of the cross section of the cable is at least twice the height of the cross section of the cable. More preferably, the width is at least three times the height.

For the purposes of the present description and claims, the term "electric conductor" denotes a conductive metal, generally in form of joint wires, surrounded by concentric layers having various functions, including electrical insulation.

Preferably, the two ducts for fluid circulation are each arranged alongside one of the main electric conductors, in an inner position with respect to the corresponding end of the major side of the composite cable.

Advantageously, the cable of the present invention comprises at least one further conductor, referred to as a secondary conductor. Preferably, these secondary conductors are arranged in a position innermost than that of the two ducts for fluid circulation with respect to the ends of the major side of the cable.

The secondary conductors can have electrical connection functions, for example to service sensors of the plant. The electrical capacity of the secondary conductors is, however, smaller than that of the main conductors. The secondary conductors can comprise optical conductors.

Preferably, the cable of the invention comprises an outer sheath surrounding at least the two main electric conductors and the two ducts for fluid circulation, and based on cross-linked ethylene/vinyl acetate copolymer, optionally added with an anti-UV additive.

Preferably, the outer sheath is added with a flame retardant additive. Examples of flame retardant additives are aluminium hydroxide and synthetic or natural magnesium hydroxide.

Advantageously, each main electric conductor comprises a conductive core formed by a plurality of copper conductors, each optionally covered by a layer of tin. Preferably, the conductive core is a class 5 conductor according to EN 60228 2004-11 standard.

Preferably, the conductive core of each main electric conductor is surrounded by one or more tapes of nonwoven fabric.

Advantageously, each duct for fluid circulation comprises a corrugated tube, preferably of stainless steel.

Each duct for fluid circulation preferably comprises a silicone layer in a radially outer position with respect to the corrugated tube. Advantageously, a braid of wires is arranged between the corrugated tube and the silicone layer.

In a second aspect, the present invention relates to a solar cogeneration plant comprising at least one cell adapted to produce electric current, connected to a plant for the distribution of electrical energy and hot fluid by a composite flat cable having, in cross section, a major side and comprising two main electric conductors and at least two ducts for fluid circulation, the main electric conductors being arranged each at an end of the major side of the cable.

Cells adapted to produce electric current are preferably chosen from among photovoltaic, thermoelectric or thermionic cells.

Advantageously, the cogeneration plant of the present invention comprises a solar radiation (photons) concentrator.

Advantageously, the cogeneration plant of the invention comprises at least one surface exposed to the solar radiation and, preferably, able to orient itself to follow the path of the sun.

The present invention will become clearer in the light of the following detailed description, which is provided purely by way of non-limiting example and is to be read with reference to the enclosed drawings, in which:

FIG. 1 is a schematic cross section of a cable 10 according to a first embodiment of the present invention.

The cable 10 comprises an outer sheath 2 made of polymer material resistant to ultraviolet (UV) rays. In one embodiment, the outer sheath is made of a polymer resistant up to about 120° C. for at least 20 years according to Arrhenius' aging model, and flexible, for example a cross-linked ethylene/vinyl acetate copolymer mixed with anti-UV additive. This material is particularly advantageous in that it affords good flexibility, resistance and interstitial filling.

Advantageously, the polymer material of the outer sheath 2 is flame retardant, i.e. it is able to resist fire and to delay the propagation thereof in accordance to IEC 332-1 (1993) and IEC 332-3 (1992) standards.

In one embodiment, the cable 10 has a width L of from about 30 millimeters (mm) to about 40 mm, and a height H of about 15-20 mm, for example 18 mm.

Figure 1:
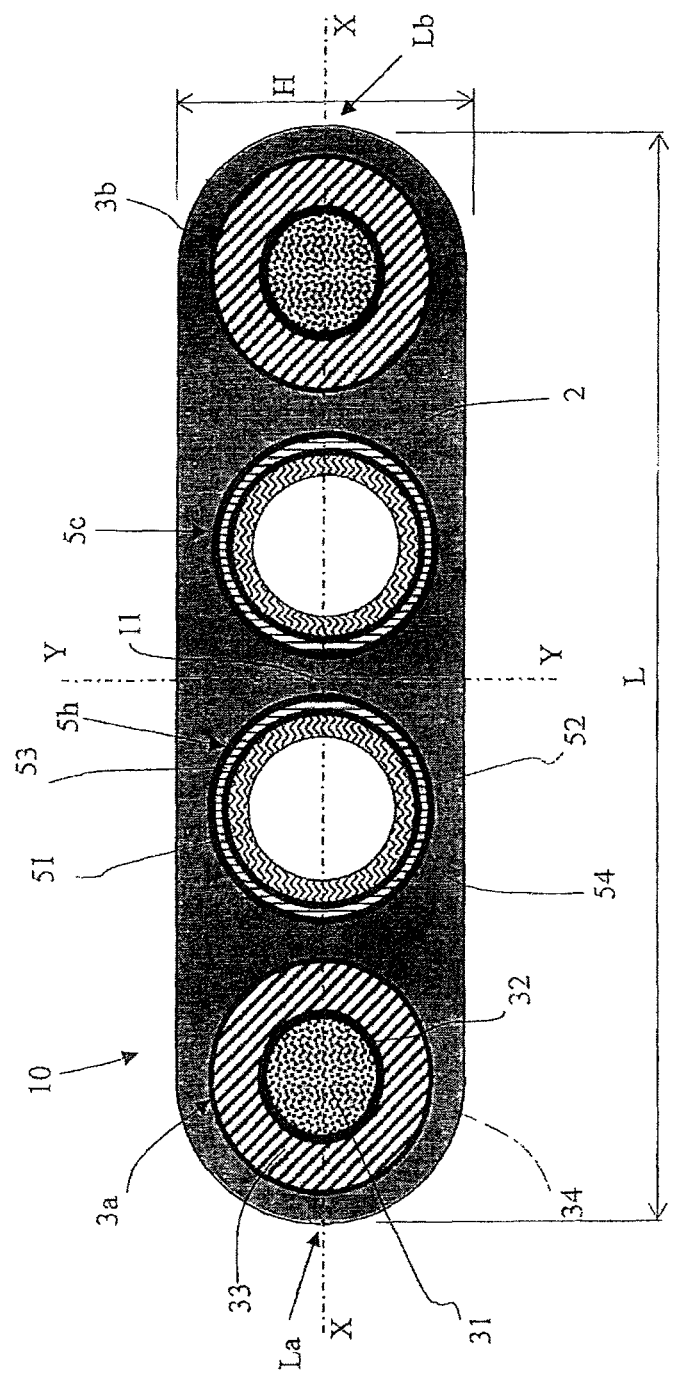
FIG. 1 is a schematic cross section of a cable according to a first embodiment of the present invention.

Preferably, the cable 10 of the present invention is a cable which, as seen in cross section with respect to the longitudinal axis, is roughly rectangular with short sides formed by curved lines, for example by semicircles, as shown in FIG. 1.

The cable 10 has a longitudinal axis 11. FIG. 1 also shows the paths of two planes X-X and Y-Y, which are perpendicular to one another and pass through the longitudinal axis 11. The cable 10 shown in FIG. 1 is preferably symmetrical with respect to the plane X-X and to the plane Y-Y.

The cable 10 comprises two main conductors 3a and 3b and two ducts 5h and 5c for fluid transportation. The two main conductors 3a and 3b are alike. For descriptive convenience, these will be denoted simply by the numeral 3. Similarly, the ducts 5h and 5c too are alike, and, for descriptive convenience, will be denoted simply by the numeral 5. The letters "a", "b", "c", and "h" will be used, for example, when describing the simulations carried out on the cable of the present invention.

As schematically shown in FIG. 1, the two main conductors 3 are preferably arranged at the two lateral ends La and Lb of the cable 10, that is with the greatest axial spacing with respect to the plane Y-Y. Each main conductor 3 preferably comprises, from the centre outwards, a conductive core 31, a first tape 32, for example made of polyester, which extends longitudinally around the conductive core 31, an inner insulating layer 33, and a second tape 34.

The conductive core 31 is advantageously formed by a plurality of copper conductors, each optionally covered by a layer of tin. Advantageously, the conductive core is a class 5 conductor according to EN 60228 2004-11 standard. Conductive cores having such a structure have marked flexibility characteristics facilitating the installation of the cable and the operation thereof, especially in a plant equipped with a surface exposed to the solar radiation and able to orient itself to follow the path of the sun, when the cable is subjected to twisting.

The inner insulating layer 33 can be made of silicone material, for example Elastosil R 501/75 MH L8-0 C6 Black 9005 RM041271, or of a polymer, such as an ethylene/propylene copolymer. Advantageously, the inner insulating layer 33 has flame retardant characteristics as mentioned above.

The second tape 34 can advantageously be in the form of a nonwoven polyester tape.

The first tape 32 and/or the inner insulating layer 33 ease the process of stripping the conductive core 31, for example when it is necessary to connect the conductive core 31 to other electric elements or components (not shown).

In one embodiment, the outer diameter of the main conductor 3 is about 13 mm.

In the embodiment shown in FIG. 1, the ducts 5 for fluid transportation have a roughly circular cross section and are advantageously arranged in an axially inner position with respect to the two main conductors 3.

Preferably, the two ducts 5 for fluid transportation are arranged symmetrically with respect to the plane Y-Y, i.e. the centres thereof, positioned substantially on the plane X-X, are substantially at the same distance with respect to the plane Y-Y.

In one embodiment, each duct 5 comprises a corrugated tube 51, preferably of stainless steel. The corrugated tube 51 can have an inner diameter of about 6 mm and an outer diameter of about 9.5 mm.

Preferably, a layer 52 of nonwoven tape, for example of polyester, is wound around the corrugated tube 51, with a minimum overlap equal to, for example, about 25%.

Preferably, the duct 5 also comprises, in a radially outer position with respect to the layer 52, a braid of polyester wires (not shown) and, in an outer position with respect thereto, a silicone layer 53, for example Elastosil R 501/75 MH L8-0 C6 5015 RM042438. The braid advantageously allows extruding the silicone layer 53 around the corrugated elements of the corrugated tube 51. Advantageously, the braid angle is less than 30° with respect to the longitudinal axis of the corrugated tube 51.

Preferably, the duct 5 also comprises, in a radially outer position with respect to the silicone layer 53, a further layer 54 of nonwoven polyester tape, with a minimum overlap equal to, for example, about 25%.

The duct 5 can also comprise, in a radially outer position with respect to the layer 54, a further layer of polyester tape (not shown).

Advantageously, the outer diameter of the duct 5 is substantially identical to the outer diameter of the main conductors 3, for example about 13 mm.

The two ducts 5 form a circuit for fluid transportation: one of the two ducts (that denoted by 5c) carries fluid to be heated whereas the other of the two ducts (that denoted by 5h) carries heated fluid.

Figure 2:
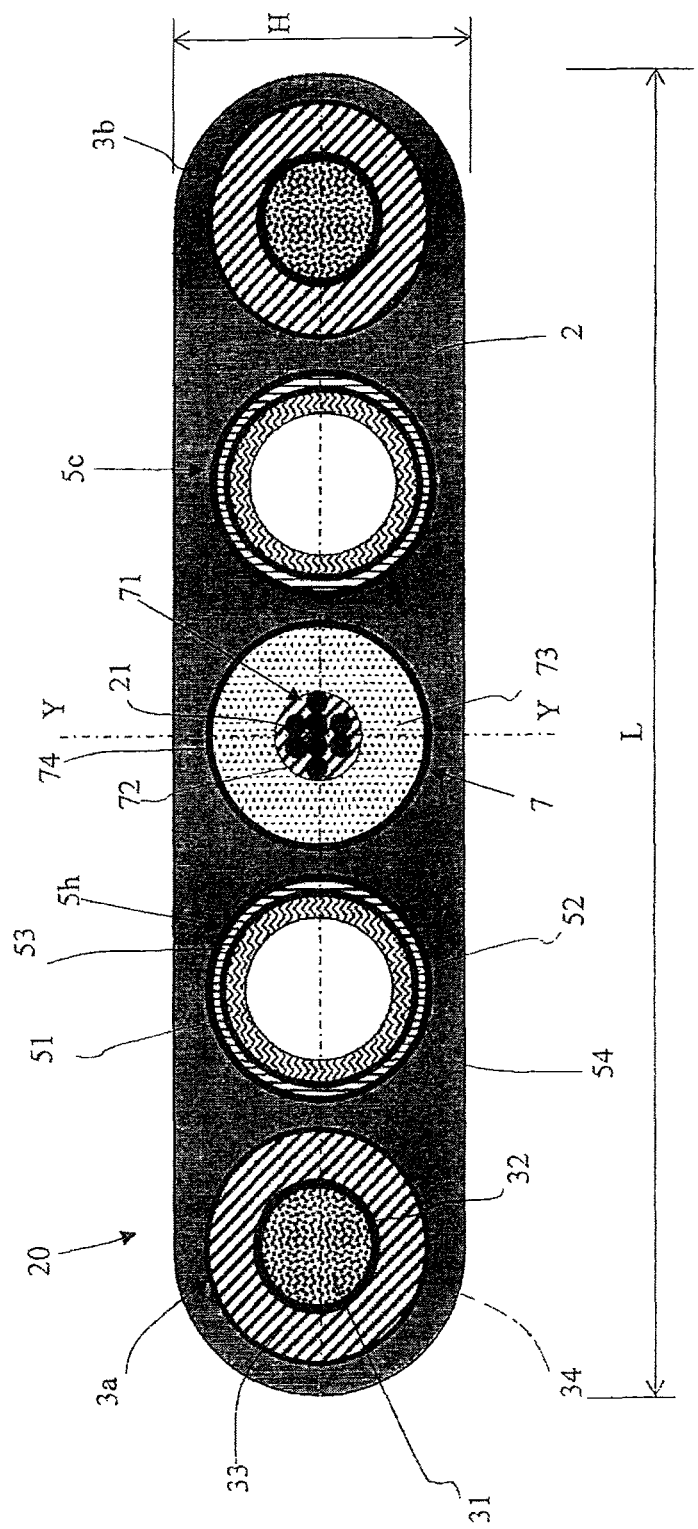
FIG. 2 is a schematic cross section of a cable according to a second embodiment of the present invention.

FIG. 2 is a schematic cross section of a cable 20 according to a second embodiment of the present invention. The cable 20 comprises elements similar to those of the cable 10, and these have been denoted by the same reference numerals as used in FIG. 1. This cable too is substantially preferably symmetrical with respect to the plane X-X and to the plane Y-Y. In FIG. 2, planes X-X and Y-Y are perpendicular to one another and pass through the longitudinal axis 21.

In addition to the elements already present also in the cable 10, the cable 20 comprises a secondary electric conductor intended to connect detection/diagnosis sensors, a sensory conductor 7. The latter is preferably arranged in an axially inner position with respect to the two main conductors 3 and to the two ducts 5. This arrangement is advantageous because it affords a cable symmetrical with respect to the plane Y-Y. Moreover, it allows keeping the main conductors 3 at the ends of the cable and the ducts 5 alongside the main conductors 3 (for reasons which will be explained more clearly hereinbelow). In the embodiment shown in FIG. 2, the sensory conductor 7 is arranged between the two ducts 5.

The sensory conductor 7 comprises a plurality of suitably twisted pairs of copper wires 71. By way of example, it comprises four pairs of copper wires 71. The pairs of copper wires can have a cross-sectional area of 0.75 mm², for example.

In a radially outer position with respect to the pairs of copper wires 71, an insulation 72 is provided, for example made of ethylene vinyl acetate (EVA), with a thickness of about 0.6 mm, for example.

Preferably, a thickness 73 made of a silicone material is arranged in a radially outer position with respect to the insulation 72.

Preferably, a layer 74 made of nonwoven polyester tape is provided in a radially outer position with respect to the thickness 73.

A braid of polyester wires (not shown) can be provided in a radially outer position with respect to the layer 74. Said braid advantageously helps a stable extrusion process.

A further layer made of a nonwoven polyester tape (not shown) can be provided in a radially outer position with respect to said braid.

In a preferred embodiment, the outer diameter of the sensory conductor 7 is substantially identical to the outer diameter of the main conductor 3, for example about 13 mm.

In one embodiment, the cable 20 has a width L of from about 40 mm to about 50 mm and a height H of about 15-20 mm, for example 18 mm.

Figure 3:
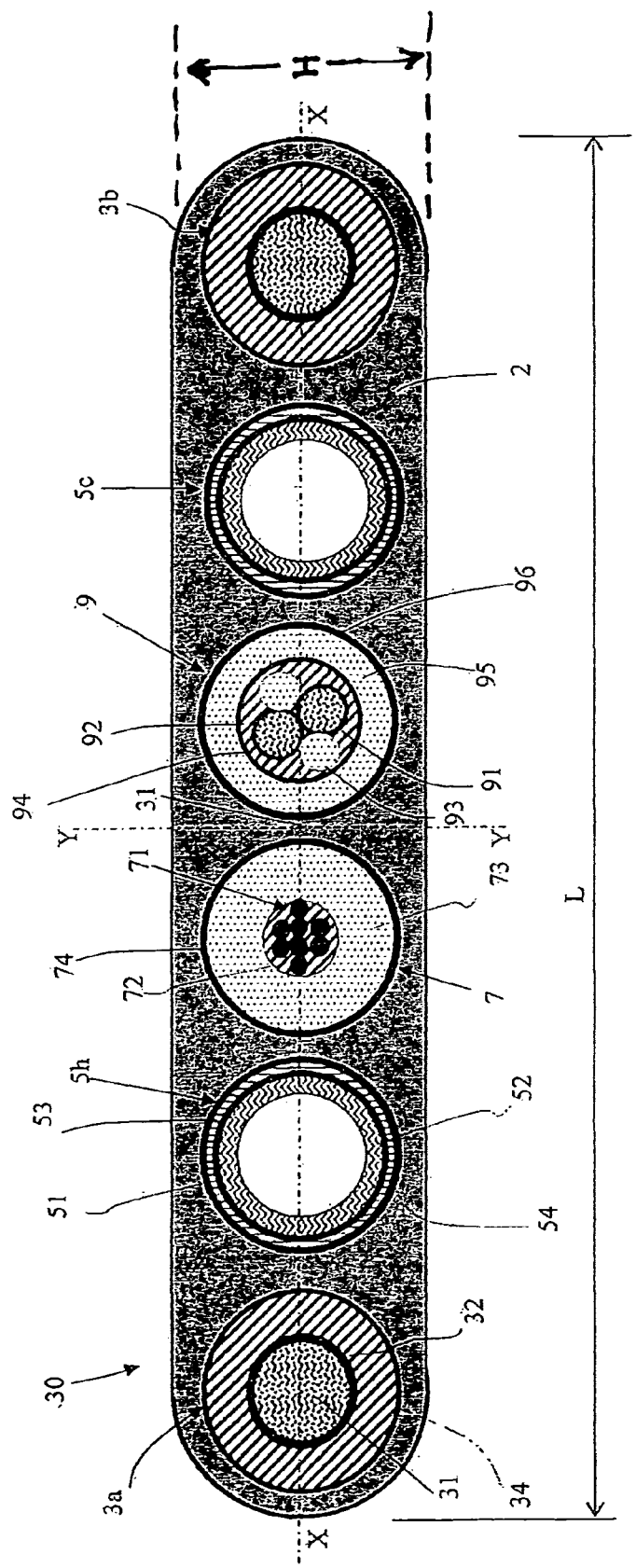
FIG. 3 is a schematic cross section of a cable according to a third embodiment of the present invention.

FIG. 3 is a schematic cross section of a cable 30 according to a third embodiment of the present invention. The cable 30 comprises elements similar to those of the cable 10 and of the cable 20, and these have been denoted by the same reference numerals as used in FIGS. 1 and 2. In FIG. 3, planes X-X and Y-Y are perpendicular to one another and pass through the longitudinal axis 31.

In addition to the elements present also in the cable 10 and 20, the cable 30 comprises a secondary electric conductor 9. The secondary electric conductor 9 has a current rating less than that of the main conductors 3 and, as a result, develops less heat. In view of this, according to the present invention, it is preferably arranged in an axially inner position both with respect to the main conductors 3 and to the ducts 5 for fluid transportation.

The secondary electric conductor 9 comprises, for example, two conductive cores 91 having a diameter, for example, of about 9.5 mm. The conductive cores 91 are made up of stranded copper wires, each optionally covered by a layer of tin, and advantageously of class 5 according to EN 60228 2004-11 standard.

Preferably, the conductive cores 91 are stranded with auxiliary stranding elements 93, obtained for example by the extrusion of a polymer on a yarn support.

An insulating layer 92, for example made of silicone material, is provided in a radially outer position with respect to the conductive cores 91 and, if appropriate, to the auxiliary stranding elements 93. The insulating layer 92 can have a thickness of about 0.9 mm.

Preferably, a layer of tape 94, for example made of nonwoven polyester, is provided in a radially outer position with respect to the insulating layer 92.

In a radially outer position with respect to the layer of tape 94, a thickening section 95 is provided, for example made of silicone material, which preferably, in turn, is covered with a braid 96, for example of polyester threads. The braid 96 advantageously improves the extrusion of the outer sheath 2.

Preferably, a tape (not shown), for example made of nonwoven polyester, is provided in a radially outer position with respect to the braid 96.

Preferably, the outer diameter of the secondary electric conductor 9 is substantially identical to the outer diameter of the main conductor 3, for example about 13 mm.

In the third embodiment, the cable 10 has a width L of from about 50 mm to about 70 mm, for example about 60 mm, and a height H of about 15-20 mm, for example 18 mm.

In all of the three embodiments, it is preferable that the conductors and the ducts of the hydraulic circuit have substantially the same diameter. Preferably, the conductors and the ducts of the hydraulic circuit are arranged such that the longitudinal axis thereof lies on the same plane (X-X), which is the preferential bending plane of the cable.

Figure 4:
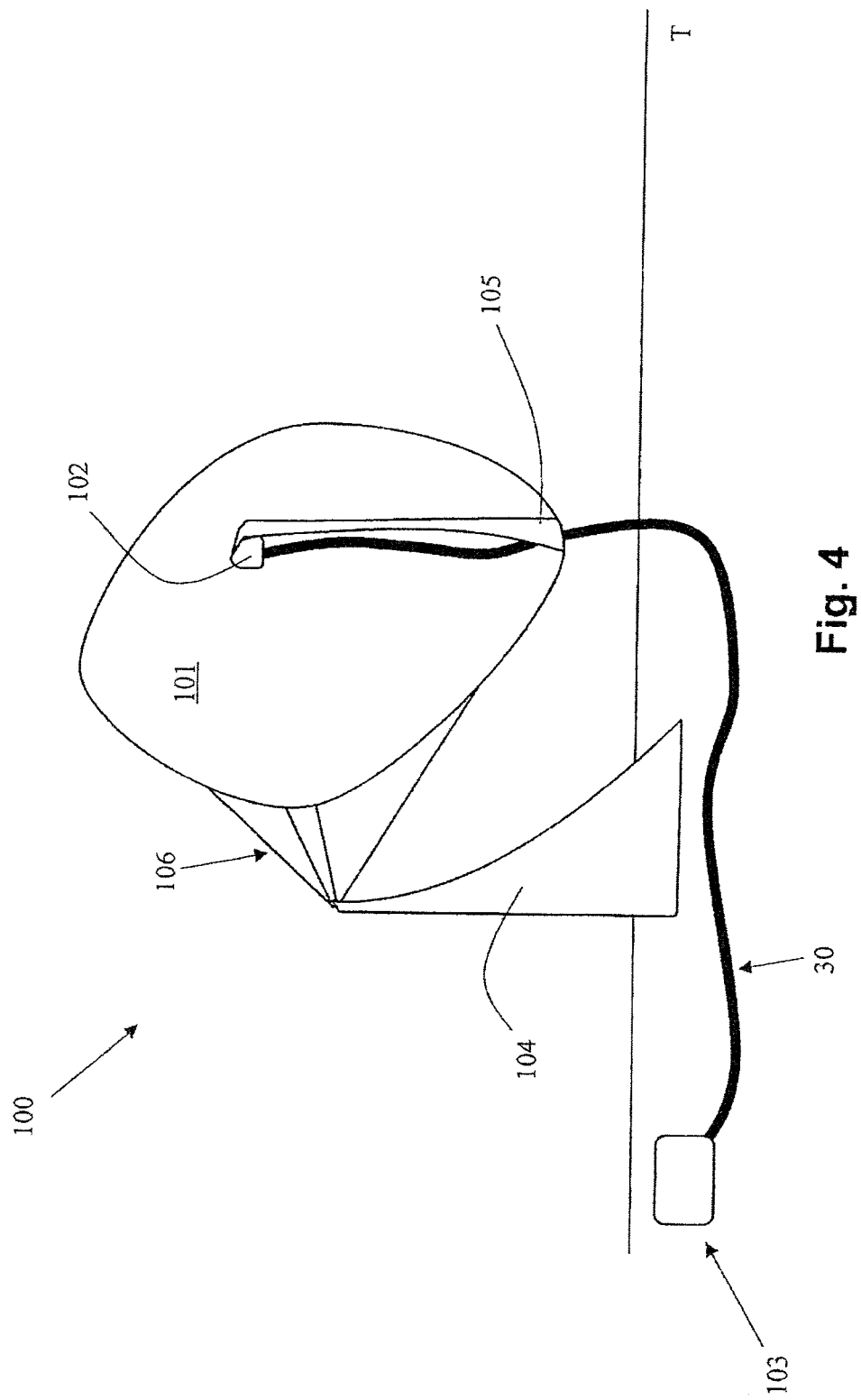
FIG. 4 schematically shows a solar cogeneration plant comprising a stretch of cable according to the present invention.

FIG. 4 shows an exemplary diagram of a concentrating solar cogeneration plant according to one embodiment of the present invention. The plant 100 comprises a surface 101 exposed to solar radiation (having a concave shape), and a cell 102 adapted to produce electric current and also including a heat exchanger (not shown in detail). The cell 102 converts the concentrated solar flux into electrical energy and into thermal energy. By way of example and with preference, the thermal energy is then transferred to a fluid pumped through a closed circuit and then conveyed to a user or plant 103. Advantageously, the surface exposed to solar radiation is mounted on a support 104 by means of arms 106, capable of following the path of the sun by moving along two axes.

The cell 102 is connected to the user or plant 103 by means of a cable length 130 according to the present invention. The cable length 130 can be in accordance either with the first embodiment, the second embodiment, or the third embodiment.

As can be seen in FIG. 4, the cell 102 is supported by an arm 105 and is connected to the cable length 130. The presence of the arm 105 and a portion of the cable length 130 creates areas of shade on the surface exposed to solar radiation. These areas of shade can reduce the efficiency of the plant. Advantageously, the cable according to the present invention has a reduced cross section (height H) and can be arranged in such a way as to create a reduced area of shade. Indeed, the cable can be arranged edgeways, that is in such a manner that the shade projected onto the surface 101 is given by the length of the cable multiplied by the height H. This height H is smaller than the diameter of a cable having a circular cross section (not shown) incorporating two main conductors having the diameter of the main conductors 3 and two ducts having the diameter of the ducts 5.

Therefore, advantageously, the flat cable according to the present invention increases the efficiency of a solar cogeneration plant in that it creates less extensive areas of shade.

In other embodiments (not shown), the solar cogeneration plant could comprise a first stage of generating electrical energy by thermionic effect (where the solar radiation heats up a ceramic component which emits electrons through thermionic effect). The current thus generated is of the order of 100 amps (A) or 200 A, at a low voltage. The plant could further comprise a second stage of generating electrical energy by thermoelectric effect (through a known thermoelectric generator). The current thus generated would have a value which is less than that generated by thermionic effect, but at a higher voltage. The plant could further comprise a third stage (hydraulic or thermal stage) for heating up a fluid (for example, water), making it circulate at a temperature of about 90° C.

Advantageously, the plant of the present invention can provide for arranging the main conductors (those carrying a high current at a low voltage) at the ends of the cable of the invention. This affords an improved dispersion of the heat generated by the high current. Indeed, the heat can be dispersed onto a wider surface.

The innermost part of the cable of the invention can instead be dedicated to the ducts. These remain better protected and insulated and disperse less heat than they would disperse if they were positioned in the outermost positions, to make it available then to the final user.

In the second and third embodiments, the conductors for the sensor devices are housed between the fluid ducts. These produce little heat since the current required to feed the sensors is typically very small (of the order of 100 milliamps (mA)), and therefore they do not require extensive dissipation areas. Furthermore, advantageously, they are mechanically protected just because of their central location.

Analogously, the secondary conductors 9 of the third embodiment are also arranged in the central part of the cable 30. Actually, these carry a relatively low current generating a relatively reduced heat.

The cable configuration of the invention also maximizes the solar radiation collected. Indeed, when the cable lies on the ground T, it stays flat, with one face in contact with the ground and one face exposed to the sun. The face exposed to the sun tends to heat up and therefore to maintain (or even increase) the temperature of the fluid in the ducts 5. The opposite face, instead, is insulated by the ground T. The heat losses will thereby be greatly reduced through that face.

Finally, the provision of a cable structure comprising both conductors and ducts for fluid transportation in an optimized configuration makes the installation operations quicker and more practical, and avoids installation errors.

Contrary to the solution described in WO 2012/079631, according to the present invention, the conductors are not in thermal contact with the ducts which carry heated fluid. Indeed, the main conductors 3 and the secondary electric conductor 9 are completely surrounded by the outer sheath 2. Similarly, the ducts 5 too are completely surrounded by the outer sheath 2.

The Applicant carried out tests using a cable according to the third embodiment.

1$^{st}$ Test

The conditions of the first test are shown in Table 1.1, in which solar flux is given in units of watts per square meter (W/m$^2$).

TABLE 1.1

| Position of the cable: | Cable lying on the ground, horizontal position |
|---|---|
| Solar flux: | 1000 W/m$^2$ flux directed onto the top face |
| Electric current: | Maximum value: 200 A in the main conductors 3a and 3b; 20 A in the secondary conductor 9 |
| Ambient temperature: | 50° C. |
| Water temperature | Hot tube 5h: 95° C. Cold tube 5c: 85° C. |

The results of the first test are shown in Table 1.2, in which heat flux is given in units of watts per meter (W/m).

TABLE 1.2

| Max. temperature of the conductors 3a, 3b | 122.6° C. |
|---|---|
| Max. temperature of the secondary conductor 7 | 117.8° C. |
| Max. temperature of the sheath | 121.4° C. |
| Heat flux in the hot tube 5h | 4.7 W/m |
| Heat flux in the cold tube 5c | 6.8 W/m |

It is clear that the cable 30 according to the third embodiment of the present invention, when resting on the ground and in extreme conditions (maximum current in the main conductors and very high external temperature), had a positive heat flux, i.e. it made the fluid in the ducts not lose heat, but rather gain heat. Advantageously, even in these extreme conditions, no component of the cable reached high temperatures (with respect to the materials used). The maximum temperature reached by the main conductors was indeed about 120° C. This makes it possible to ensure a service life of the cable of 25 years using the materials mentioned above. By changing materials, it could be possible to ensure a different service life at this maximum temperature.

2$^{nd}$ Test

The conditions of the second test are shown in Table 2.1.

TABLE 2.1

| | |
|---|---|
| Position of the cable: | Cable attached to the support arm; vertical position edgeways |
| Solar flux: | 400 W/m$^2$ flux directed onto the short side closest to the conductor 3b; 70 W/m$^2$ flux diffused onto the top and bottom faces |
| Electric current: | Maximum value: 100 A in the main conductors 3a and 3b; 10 A in the secondary conductor 9 |
| Ambient temperature: | 20° C. |
| Water temperature: | Hot tube 5h: 95° C. Cold tube 5c: 85° C. |

The results of the second test are shown in Table 2.2.

TABLE 2.2

| | |
|---|---|
| Max. temperature of the conductors 3a, 3b | 73.5° C. |
| Max. temperature of the secondary conductor 7 | 69.0° C. |
| Max. temperature of the sheath | 85.0° C. |
| Heat flux in the hot tube 5h | −17.5 W/m |
| Heat flux in the cold tube 5c | −11.9 W/m |

It is clear that the cable 30 according to the third embodiment of the present invention, when arranged vertically in real conditions, had a just slightly negative heat flux, i.e. it made the fluid in the ducts to lose little heat.

The invention claimed is:

1. A composite flat cable for a solar plant for generating electrical energy and thermal energy having in cross-section a major side, the cable comprising:
   an outer sheath;
   first and second main electrical conductors; and
   first and second ducts configured to circulate fluid;
   wherein the first and second ducts are between the first and second main electrical conductors in an inner position with respect to a corresponding end of the major side of the cable,
   wherein the first duct is alongside the first main electrical conductor,
   wherein the second duct is alongside the second main electrical conductor,
   wherein both of the first and second ducts comprise a corrugated tube, and
   wherein both of the first and second ducts further comprise a silicone layer in a radially outer position with respect to the corrugated tube.
2. The cable of claim 1, wherein the first and second ducts are directly between the first and second main electrical conductors.
3. A composite flat cable having in cross-section a major side, the cable comprising:
   an outer sheath;
   first and second main electrical conductors;
   first and second ducts configured to circulate fluid; and
   at least one secondary electrical conductor;
   wherein the first and second ducts are between the first and second main electrical conductors in an inner position with respect to a corresponding end of the major side of the cable,
   wherein the at least one secondary electrical conductor is between the first and second ducts,
   wherein both of the first and second ducts comprise a corrugated tube, and
   wherein both of the first and second ducts further comprise a silicone layer in a radially outer position with respect to the corrugated tube.
4. The cable of claim 1, wherein the outer sheath is based on cross-linked ethylene/vinyl acetate copolymer.
5. The cable of claim 1, wherein both of the first and second main electrical conductors comprise a conductive core including a plurality of copper conductors.
6. The cable of claim 5, wherein the conductive core is a class 5 conductor according to the EN 60228 2004-11 standard.
7. A solar cogeneration plant, comprising:
   at least one cell configured to produce electric current, connected to a plant for distribution of electrical energy and of heated fluid by a composite flat cable, having in cross-section a major side, the cable comprising:
   an outer sheath;
   first and second main electrical conductors; and
   first and second ducts configured to circulate fluid;
   wherein the first and second ducts are between the first and second main electrical conductors in an inner position with respect to a corresponding end of the major side of the cable.
8. The cable of claim 1, wherein an outer diameter of the first and second main electrical conductors is substantially the same as an outer diameter of the first and second ducts.
9. The cable of claim 1, wherein the first duct is configured to carry fluid to be heated, and
   wherein the second duct is configured to carry heated fluid.
10. The cable of claim 3, wherein the first duct is in a proximity of the first main electrical conductor, and
    wherein the second duct is in a proximity of the second main electrical conductor.
11. The cable of claim 3, wherein the first duct is alongside the first main electrical conductor, and
    wherein the second duct is alongside the second main electrical conductor.
12. The cable of claim 3, wherein the first and second ducts are directly between the first and second main electrical conductors.
13. The cable of claim 3, wherein the outer sheath is based on cross-linked ethylene/vinyl acetate copolymer.
14. The cable of claim 3, wherein both of the first and second main electrical conductors comprise a conductive core including a plurality of copper conductors.
15. The cable of claim 14, wherein the conductive core is a class 5 conductor according to the EN 60228 2004-11 standard.
16. The cable of claim 3, wherein an outer diameter of the first and second main electrical conductors is substantially the same as an outer diameter of the first and second ducts.

* * * * *